United States Patent [19]

Katsumata et al.

[11] Patent Number: 4,868,816
[45] Date of Patent: Sep. 19, 1989

[54] POLLING COMMUNICATION METHOD

[75] Inventors: Minoru Katsumata, Tokyo; Hisaharu Yanagawa, Ichihara; Kousaku Ohta; Shozo Inao, both of Hiratsuka; Koh Ichinowatari, Tokyo, all of Japan

[73] Assignees: The Furukawa Electric Co. Ltd.; Pioneer Electronic Corporation, both of Tokyo, Japan

[21] Appl. No.: 143,088

[22] Filed: Jan. 12, 1988

[30] Foreign Application Priority Data

Jan. 12, 1987 [JP] Japan ................................ 62-4457

[51] Int. Cl.4 .............................................. H04J 3/16
[52] U.S. Cl. ................................ 370/95.2; 340/825.54
[58] Field of Search ............... 370/96, 90; 340/825.08, 340/825.54

[56] References Cited

U.S. PATENT DOCUMENTS 4,667,193  5/1987  Cotie et al. .................... 340/825.08

Primary Examiner—Robert L. Griffin
Assistant Examiner—Wellington Chin
Attorney, Agent, or Firm—Foley & Lardner, Schwartz, Jeffery, Schwaab, Mack, Blumenthal & Evans

[57] ABSTRACT

A polling communication method which asks whether or not there is a request with data from a range of answer requesting terminals. A request is determined by a binary looking-up to terminals by a center. The center and the terminals are connected through a common signal transmission line, replying to the center that there is a request with a self-address to the requesting terminal. There is a further reducing of the range of answer requesting terminals by sequentially determining, according to a binary looking-up to specify one of the requesting terminals when a collision of the requests occurs between the terminals at the replying time. The center then asks the content of the request to the specified terminal. Thus, this method can process requests at a high speed, not only when the rate of requests of terminals is low but also when the rate of requests of terminals is high and often collide.

3 Claims, 2 Drawing Sheets

POLLING COMMUNICATION METHOD

BACKGROUND OF THE INVENTION

This invention relates to a polling communication method for exchanging predetermined data by specifying a terminal receiving requests in a short time period. The terminal centers are connected by a common transmission line (a communication line). Each asks the other whether or not there are any requests at the terminal, especially when a collision of requests occurs at the terminals between the centers and the terminals.

There are, in general, various communication systems, such as a communication system for information in a community, a communication system for education, e.g., a school education communication system, a a guide service, like a wide service CATV system.

FIG. 4 schematically shows an example of a prior art videotex system, mainly for a guide service. This communication system is composed by connecting a center A for storing predetermined information to a number of terminals $C_1$ to $C_n$ through signal transmission lines B.

In the communication system of FIG. 4, when the terminal $C_1$ requests of center A, a still picture NO. z, the center A identifies the terminal $C_1$ and the still picture number NO.z, and then transmits still picture number NO.z to the terminal $C_1$.

Therefore, in the communication system of FIG. 4, when any of the terminals $C_1$ to $C_n$ requests a predetermined service of center A through the signal transmission line B, and the center A intends to execute a service responsive to the requests, the center A must identify which of the terminals requests which kind of content of the service.

In the polling of the communication system, the center A asks what kind of service is requested at the respective terminals $C_1$ to $C_n$, and specifies the requesting terminal and the content of the request. Thus, the center A can process the above-mentioned request.

In this polling method, the most simple one is a sequential polling method.

According to the sequential polling method, the center A sequentially asks the terminals $C_1$ to $C_n$ the contents of their requests.

There is an other prior art polling method, a binary looking-up without forward address, as shown in FIG. 5.

In the polling method in FIG. 5, the center first asks whether or not there is a request to terminals $C_1$ to $C_n$ of an entire range $L_1$. When the center identifies a request, the center asks whether or not there is a request at the terminals of a range $L_2 = \frac{1}{2} \times L_1$, and when there is no request at the terminals of the range $L_2$, the center judges that there is a requesting terminal in the remaining range $L_2'$.

Thus, the range of requesting terminals is sequentially narrowed to a half, like $L_3, L_4, \ldots, L_n$, and the center continues polling until the requested terminal is specified.

In FIG. 5, the mark "o" indicates "there is a request", and the mark "x" indicates "there is no request".

The number n of pollings in the polling method in FIG. 5 is represented as below.

$$n = 1 + \log_2 N$$

where N: the number of terminals.

When N is large, such as, for example, N=100,000 the terminal requesting can be specified by (n−18) times.

Therefore, in the polling method in FIG. 5, the requestial procedure is complicated, but the number of necessary pollings can be reduced to shorten the total request processing time.

There is a polling method according to a binary looking-up with forward address that accelerates polling.

In this polling method, the terminal not only replies merely whether or not there is a request but also answers if there is a request with a self-address to the center. Thus, the center can specify the terminal requesting at the moment that the requesting terminal makes a request.

For example, assume that there are requests at terminals of addresses No. 1 and No. 50,000, the following procedure is executed.

At first polling, the center asks whether or not there is a request to all the terminals.

In this case, the terminals of No. 1 and No. 50,000 reply that they have requests, but since these two requests collide, even if the center can identify that there are requests, the center cannot identify which of the terminals have made them.

In case of the second polling, the center asks whether there are requests to the terminals of the range of No. 1 to No. 50,000.

At this time, the center can identify only that there are requests.

In case of the third polling, the center asks whether or not there are requests to the terminals of the range of No. 1 to No. 25,000.

At this time, since there is only one terminal of No. 1 requesting, a collision of the requests (replying data) does not occur and the center can identify the terminal of No. 1 requesting.

As described above, when the center thus identifies the terminal of address No. 1 requesting, the center transmits predetermined information to the requesting terminal.

However, the above-mentioned polling methods have the following drawbacks.

For example, since the most simple sequential polling method in the prior art has the number of pollings corresponding to the number of the terminals, it takes a long time to specify the requesting terminal when there are a number of terminals.

Since the polling method of FIG. 5, while desirable as compared with the sequential polling method, has no forward address, it takes a long time to specify the requesting terminal.

The most desirable binary, looking-up, polling method with forward address in the prior art can specify the requesting terminal at a high speed when the rate of requests is low, but when the rate of requesting terminals is increased so that requests from the terminals frequently collide, the polling time per request is lengthened, and the total polling time is increased that much.

SUMMARY OF THE INVENTION

Accordingly, an object of this invention is to provide a polling communication method which can process requests at a high speed not only when the rate of requests of terminals is low but also when the rate of requests of terminals is high, as requests frequently collide.

In order to achieve the above and other objects, there is provided according to the present invention a polling communication method comprising the steps of asking whether or not there is a request with data of a range of answer requesting terminals. There are determined by a binary looking-up to terminals by a center in a relationship between the center and the terminals connected through a common signal transmission line, replying to the center that there is a request with a self-address to the request by the requesting terminal of the terminals corresponding to a range of the answer requesting terminals, further reducing the range of the answer requesting terminals sequentially determined according to a binary looking-up to specify one of the requesting terminals when a collision of the requests occurs between the terminals at the replying time, and then asking the content of the request to the specified terminal by the center.

In case of the method of this invention, the center asks whether or not there is a request for data from a range of answer requesting terminals, determined by the binary looking-up to the respective terminals. The requesting terminal corresponding to the range of answer requesting terminals replies to the center to the question with self-address.

At this replying time, when there is requesting terminal, but no collision between the requests occurs, the center can immediately specify the requesting terminal by the self-address.

At the replying time, when there is a collision between the requests of the terminals, the range of the answer requesting terminals is sequentially determined according to the binary looking-up and is further reduced to specify one of the requesting terminals. Thus, the center can specify the requesting terminal without waste, even in this case.

Here, an equation regarding the total communication data amount Z of the polling communication is represented as the following equation (1) according to this invention, and an equation according to the conventional method becomes as the following equation (2).

The following equations helps explain the invention:

$$(Xdn+Xup)x(y+y')=(Xdn+Xup+up)xy$$
$$=Z+(Xdn+Xup)xy-upxy' \quad (1)$$

$$(Xdn+Xup+up)x(y+y')=Z \quad (2)$$

The terms of the above equation (1) and (2) represent the following meanings:

Xdn: Data format length necessary for downward communication from the center to the terminal Xup: Data format length necessary for upward communication from the terminal to the center (however, upon including no request)

Xup+up: Data format length including the content of a request in the upward communication.

Y+Y': Number of polling communications necessary for binary looking-up polling with upward address.

Y: Number of terminals having requests.

Y': Number of collisions of the requests.

According to the method of this invention as apparent from the above equation (1), in case of $((Xdn+Xup)y)$ smaller than ($upxy'$), that is, when the data amount representing the content of a request if more than other data amount, or when collisions occur, communication data amount reduces to accelerate the polling communication On the other hand, in the case of the conventional method (that is, the most desirable polling method in the prior art), as apparent from the equation (2), requests from the terminals frequently collide to increase the value of $((y+y')$ to lengthen the total time of polling.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of a polling communication method, according to the present invention, will be described in detail with reference to the accompanying drawings.

Figure 2:
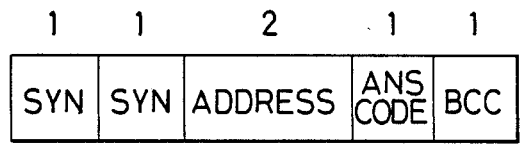
Figure 3:
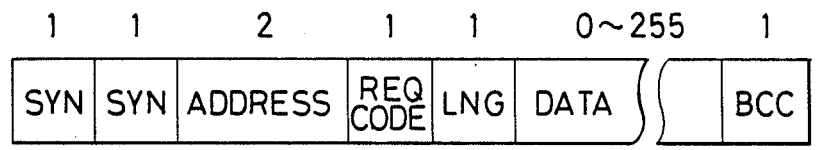
Figure 4:
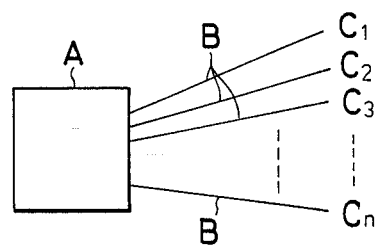
FIG. 4 is an explanatory view schematically showing a center and terminals connected through signal transmission lines.
Figure 5:
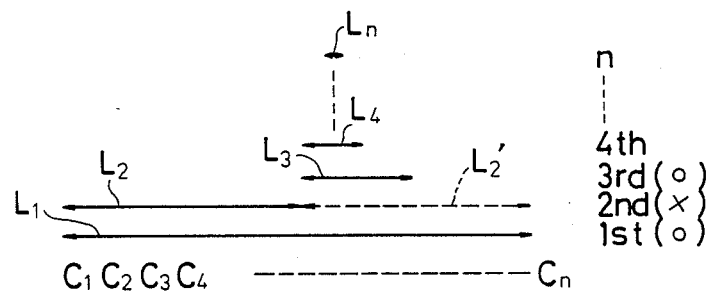
FIG. 5 is an explanatory view schematically showing an example of a conventional polling method.

A system for processing requests from 30,000 user terminals to a screen source (100,000 of source screens) of a center is composed of a superminicomputer, and the data formats of polling are set to Xdn=8 bytes (FIG. 1), Xup=6 bytes (FIG. 2) and up=10 bytes (FIG. 3).

In this case, the polling communication data amount of the method of this invention becomes 1,000 bytes according to equation (1), being less in the number of bytes, but the polling communication data of the prior art becomes 2016 according to equation (2), being more in the number of byte.

Various formats can be considered as the data format of polling according to the method of this invention, but data format can be set as an example to satisfy the following requesting conditions.

(a) A time for processing 30 of requests is set to approx. 0.4 sec. or shorter.

(b) An error remedy (continuous transmission or retransmission) is taken.

(c) 64 kbps channel 1 CH is used.
  Upward: PSK-NRZ1 code, and downward: FSK-NRZ code.

(d) 30,000 terminals are covered.
  $2^{16}=6500$ terminals and 16 bits are required.

(e) 100000 screens are covered.
  $2^{17}=130,000$ terminals and 17 bits are required.

Figure 1:
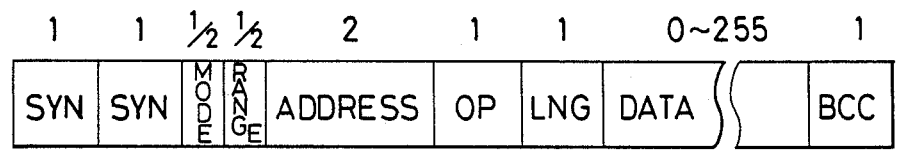
FIGS. 1 to 3 are explanatory views schematically showing a polling communication method according to the present invention.

FIG. 1 shows an example of downward data format under such requesting conditions.

In FIG. 1, the numerals indicated on the respective formats represent the number of bytes.

SYN in FIG. 1 is a synchronization signal, having functions of AGC (an automatic gain control for a signal processing circuit) and STX (Start of text).

MODE in FIG. 1 is a command mode, a search mode is "0", and a request mode is "1".

In FIG. 1, RANGE (Addressing Range) indicates that the number of bits is as accessible address from LSB (Least Significant Bit) of the following address field (Address).

That is, RANGE can indicate numerals of 0 to 15.

Assume that RANGE=0, it indicates that a digit of $2^0$ of address field (Address), i.e., only the bit of LSB is valid. In case of RANGE of RANGE=5, it indicates that digits of $2^0$ to $2^5$ address field are valid.

When the binary looking-up polling is executed on the basis of the above principle, codes of logic "1" or "0" for LSB (Least Significant Bit) of address field (Address) and "0" for RANGE are transmitted from the center to allow only the terminal to reply (answer) in which LSB of the terminal address coincides with LSB of the address field.

At this time, the terminals which can reply become ½ of the entire number of the terminals.

In this case, if no collision occurs between the requests among the terminals, the center can detect the replying terminal. If there is no replying terminal, it is assumed that there is a terminal which replies in other logic of LSB of the terminal addresses. Thus, the logic of LSB of the address field is inverted, and the code in which RANGE is "1" is transmitted from the center to the terminals of the inverted range.

In this case, only the terminals in which two digits from LSB of self-terminal address coincide with two digits from LSB of the address field are allowed to reply, but other terminals cannot reply.

At this time, the terminal which can replay is reduced to ¼ of the entire number of the terminals.

Thus, the terminals which can reply are sequentially reduced by increasing by one in RANGE to detect the replied terminal by a sensor.

Since the address field (Address) in FIG. 1 is composed of 2 bytes, it can cover up to approx. 65,000 terminals.

As described above, the answer request executed with data of answering requesting terminal range determined by binary looking-up, i.e., the question of whether or not there is a request is always conducted by the center or executed only when the requests collide between the terminals.

In OP (Operation Code) in FIG. 1, "0" means an enquiry (ENQ: enguiry) whether or not there is a request from the center to the terminal, and "1" means an acknowledge character (ACK: acknowledge character) transmitted from the center to the terminal.

In FIG. 1, 2 to 255 are codes used for other services.

LNG (Length) in FIG. 1 indicates data length, and LNG represents the following data field length (2 to 255).

Since the end of the data field is clarified by the LNG, it does not need ETX (end of text).

DATA in FIG. 1 is used for addition of a function in future (data down load, an increase in the data reliability by image requesting echo back, etc.).

In the polling of the method of this invention, it is initially set to 0 bytes.

BCC (Block Check Code), in FIG. 1, is used to detect the error of downward command to be transmitted from the center to the terminal at the terminal.

FIG. 2 shows an example of short format of upward data, and FIG. 3 shows an example of long format of upward data.

The short format is used only for the case that an acknowledge character is transmitted to the center for a request (which does not include what is requested), and the long format is used for the case that a picture request data is returned to mode=1 and operation code (OP)=0 from the center.

Thus, when the short format and the long format are distinguished in use, it does not take time to search the requesting terminal.

SYN, MODE, ADDRESS, and BCC in FIGS. 2 and 3 are the same as those described with respect to FIG. 1, and LNG, DATA in FIG. 3 are the same as those described with respect to FIG. 1.

ANS' CODE (Answer Code) in FIG. 2 is a field for indicating ACK, NAK of the case of down loading data in downward command.

REQ CODE (Request Code) in FIG. 3 is to request data echo received at the center from the terminal to the center to improve the data reliability.

DATA in FIG. 3 includes screen number, secret number and the other, and is, for example, set to 10 bytes.

According to the polling communication method of this invention as described above, the center can specify the requesting terminals according to predetermined polling means, and then asks the content of the request to the specific terminal. Thus, when searching the requesting terminal, the center can execute the communication at a high speed with the upward data of the short format. Therefore, the center can specify the requesting terminal at a high speed.

Particularly, when requests occur at high rate from a number of terminals so that collisions frequently occur, the center can specify the requesting terminal and the content of the request at higher speed.

What is claimed is:

1. A polling communication method, comprising the steps of:
   (a) providing a range of answer requesting terminals;
   (b) providing each such terminal with an individual binary self-address;
   (c) providing a computer operated center connected to each terminal through a common signal transmission line;
   (d) polling each terminal by the center to determine if there has been a request for data addressed to any of the terminals;
   (e) responding to the center by the terminal or terminals that have received a request, the response including a self-address; and
   (f) sequentially reducing the range of terminals in order to identify the terminal or terminals to which the request was addressed by comparing the least significant bits in each self-address to the least significant bits in a binary number representing the range of terminals.

2. The polling communication method of claim 1, wherein, in step (d), the center always makes a predetermined inquiry to the terminals.

3. The polling communication method of claim 1, in which the center, in step (d), makes a predetermined request to the terminals in cases where more than one terminal responds to the inquiry.

* * * * *